United States Patent
Park et al.

(10) Patent No.: US 11,073,283 B2
(45) Date of Patent: Jul. 27, 2021

(54) TURBULENCE GENERATING STRUCTURE FOR LINER COOLING ENHANCEMENT AND GAS TURBINE COMBUSTOR HAVING THE SAME

(71) Applicant: DOOSAN HEAVY INDUSTRIES & CONSTRUCTION CO., LTD., Changwon-si (KR)

(72) Inventors: Sung Wan Park, Busan (KR); Jong Hwa Lee, Anyang-si (KR); In Chan Choi, Gwangyang-si (KR); Moon Soo Cho, Seoul (KR)

(*) Notice: Subject to any disclaimer, the term of this patent is extended or adjusted under 35 U.S.C. 154(b) by 90 days.

(21) Appl. No.: 16/112,807

(22) Filed: Aug. 27, 2018

(65) Prior Publication Data

US 2019/0107054 A1 Apr. 11, 2019

(30) Foreign Application Priority Data

Oct. 11, 2017 (KR) .................. 10-2017-0130105

(51) Int. Cl.
*F23R 3/00* (2006.01)
*F02C 7/18* (2006.01)
*F23R 3/44* (2006.01)

(52) U.S. Cl.
CPC ............ *F23R 3/002* (2013.01); *F02C 7/18* (2013.01); *F23R 3/44* (2013.01); *F23R 2900/03045* (2013.01)

(58) Field of Classification Search
CPC .. F01D 9/023; F23R 3/002; F23R 3/06; F23R 2900/03045; F02C 7/18; F05D 2260/2212; F28F 3/027; F28F 5/04; F28F 13/08

(Continued)

(56) References Cited

U.S. PATENT DOCUMENTS

| 3,736,747 A | 6/1973 | Warren |
| 3,938,323 A | 2/1976 | Quigg et al. |

(Continued)

FOREIGN PATENT DOCUMENTS

| EP | 2921779 A1 | 9/2015 |
| JP | 10-200278 A | 7/1998 |

(Continued)

OTHER PUBLICATIONS

An European Search Report dated Nov. 26, 2018 in connection with European Patent Application No. 18190909.4 which corresponds to the above-referenced U.S. application.

*Primary Examiner* — Katheryn A Malatek

(57) ABSTRACT

A turbulence generating structure for liner cooling enhancement is a liner cooling structure applied to a double-structured side portion formed by a liner and a flow sleeve and includes the liner and a first turbulence generator protruding from a surface space of the liner and including a plurality of ribs arranged in an axial direction, each of the ribs comprising blocks arranged at regular distances in the axial direction and interspaced by cooling holes. The ribs include a first set of adjacent ribs separated by a first passage distance, the first passage distance being repeated in a circumferential direction, and a second set of adjacent ribs separated by a second passage distance, the second passage distance being repeated in the circumferential direction, wherein the first and second sets of adjacent ribs have exactly one rib in common, and the first passage distance is greater than the second passage distance.

16 Claims, 16 Drawing Sheets

(58) Field of Classification Search
USPC .................................................... 160/109.1
See application file for complete search history.

(56) References Cited

U.S. PATENT DOCUMENTS

| | | | | |
|---|---|---|---|---|
| 6,018,950 | A * | 2/2000 | Moeller | F01D 9/023 |
| | | | | 29/889.2 |
| 7,007,482 | B2 | 3/2006 | Green et al. | |
| 8,453,460 | B2 | 6/2013 | Dugar et al. | |
| 2002/0005274 | A1* | 1/2002 | Beeck | F28F 13/12 |
| | | | | 165/109.1 |
| 2004/0074239 | A1* | 4/2004 | Tiemann | F23M 5/04 |
| | | | | 60/798 |
| 2004/0079082 | A1 | 4/2004 | Bunker | |
| 2007/0131396 | A1* | 6/2007 | Yu | F28F 1/40 |
| | | | | 165/133 |
| 2010/0119372 | A1* | 5/2010 | Gage | F01D 5/187 |
| | | | | 416/223 R |
| 2012/0247111 | A1* | 10/2012 | Narcus | F23R 3/005 |
| | | | | 60/752 |
| 2016/0102861 | A1* | 4/2016 | Cunha | F23R 3/06 |
| | | | | 60/752 |

FOREIGN PATENT DOCUMENTS

| | | |
|---|---|---|
| JP | 2000-088252 A | 3/2000 |
| JP | 2009-085222 A | 4/2009 |
| JP | 2010-203440 A | 9/2010 |
| JP | 2016-003644 A | 1/2016 |
| KR | 19990078416 A | 10/1999 |
| KR | 10-2013-0137690 A | 12/2013 |
| KR | 10-1786858 B1 | 10/2017 |

\* cited by examiner

[FIG. 1]
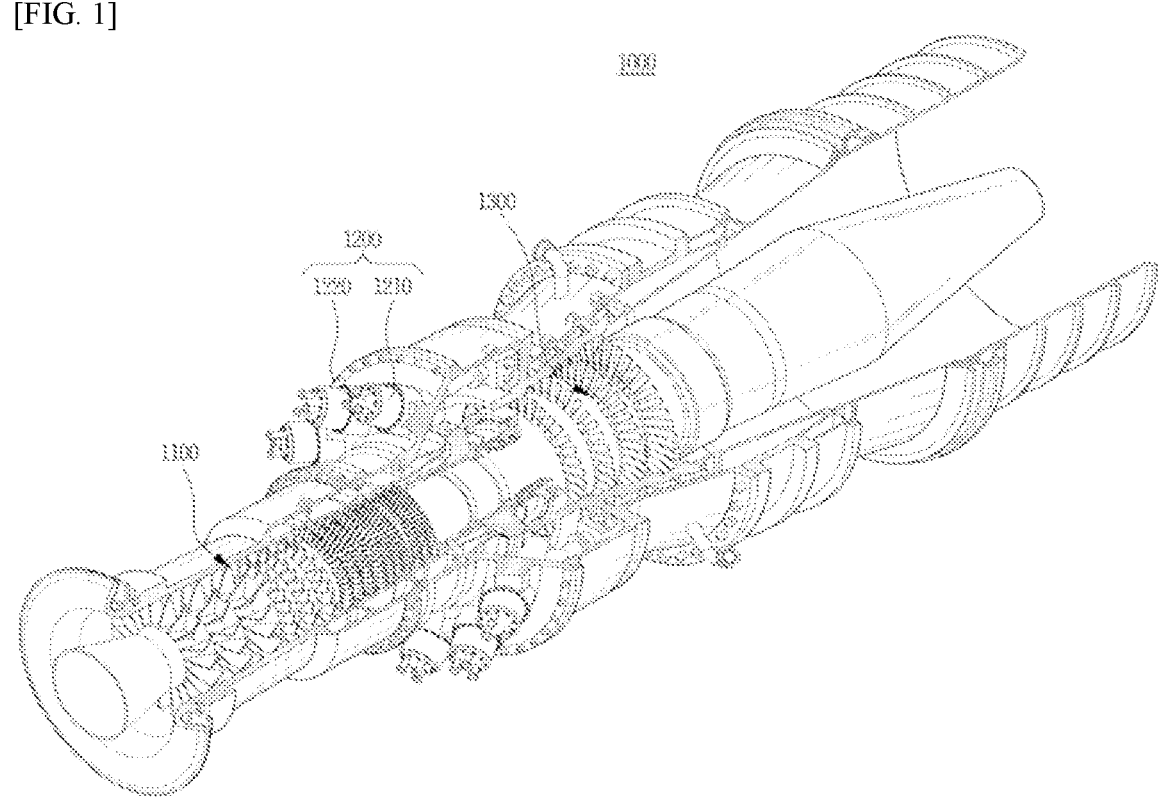

[FIG. 2]
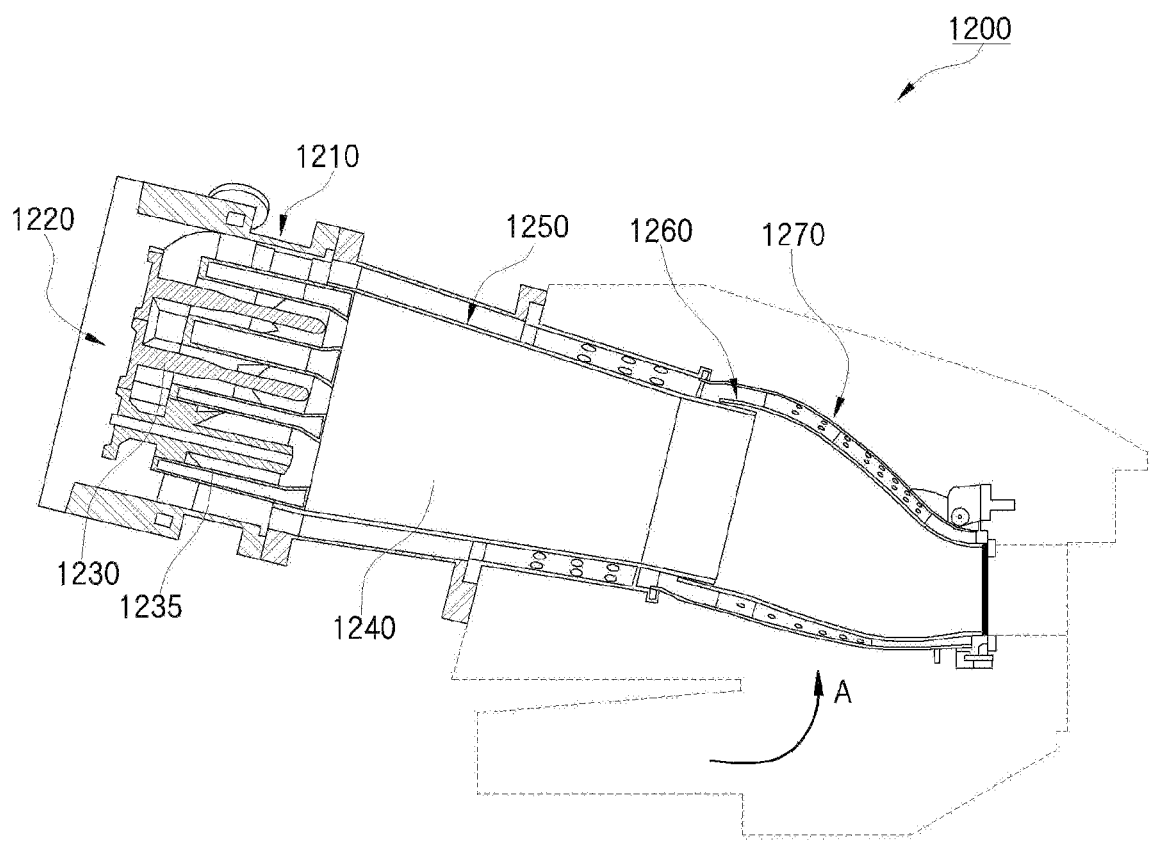

[FIG. 3]
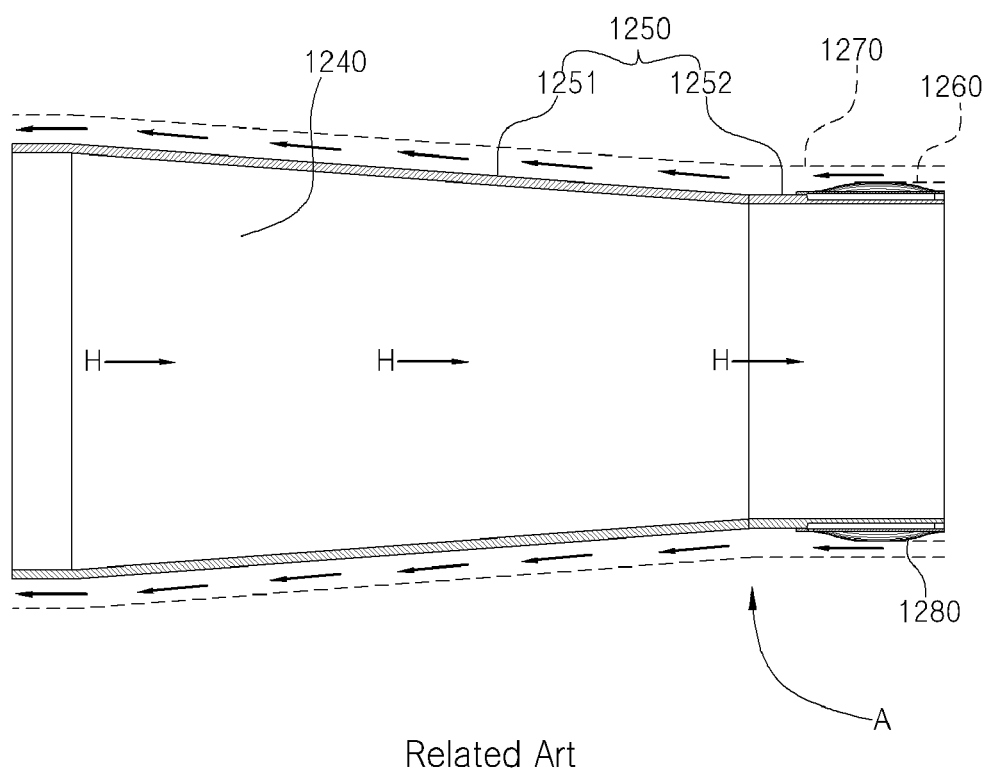
Related Art

[FIG. 4]
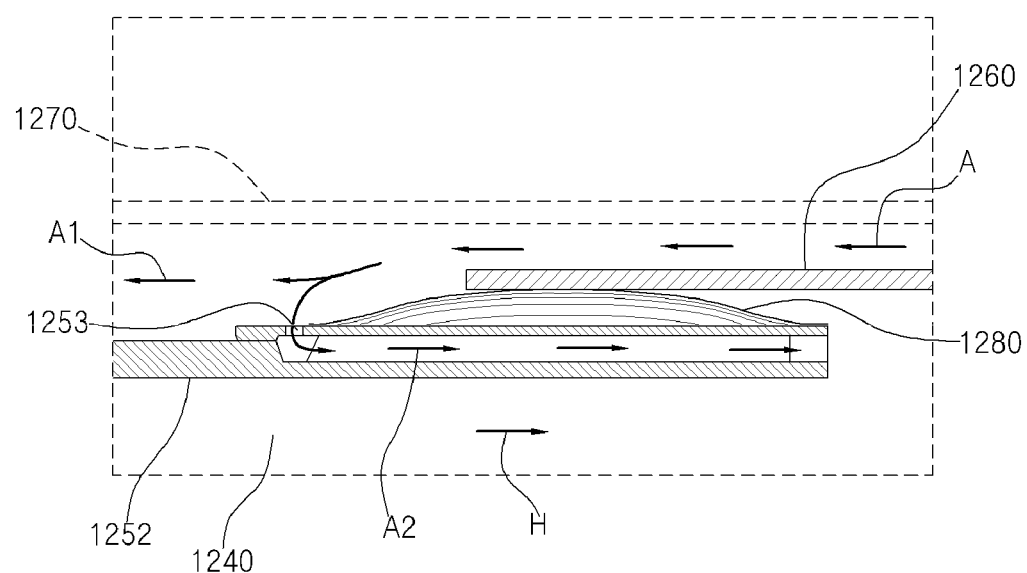
Related Art

[Fig.5]
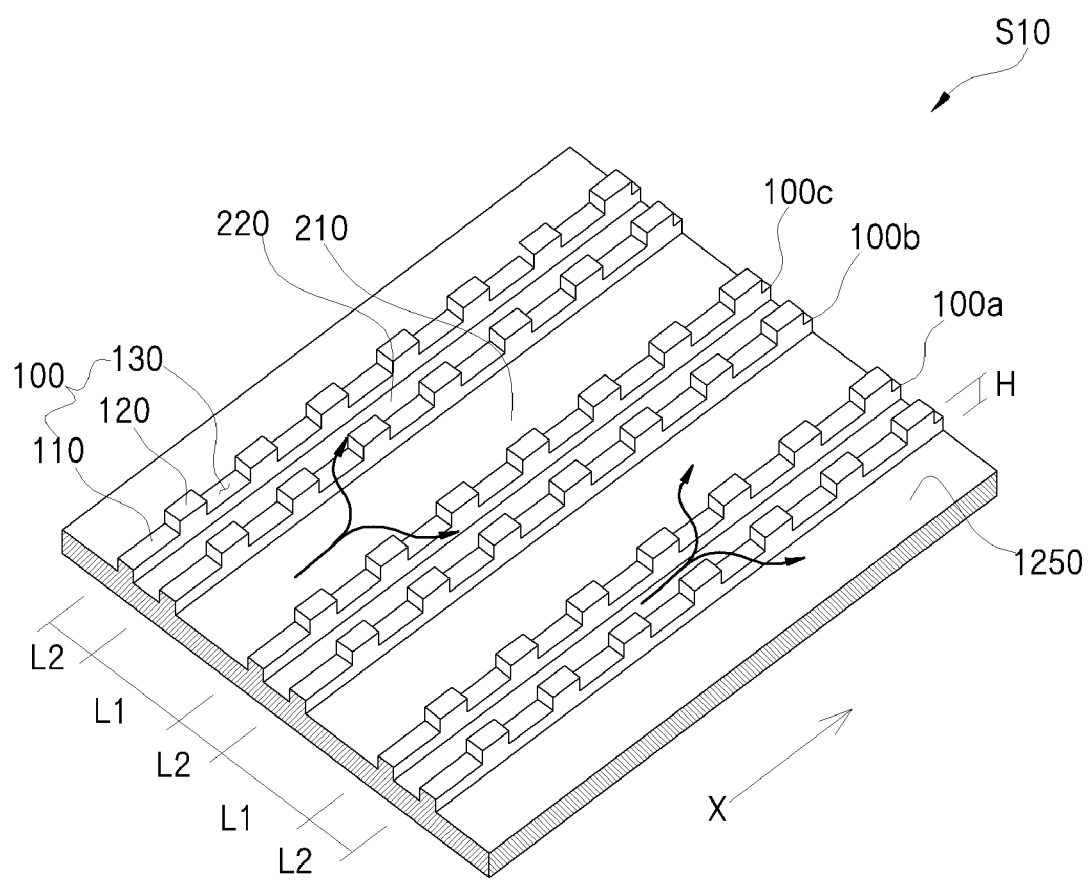

[Fig.6]
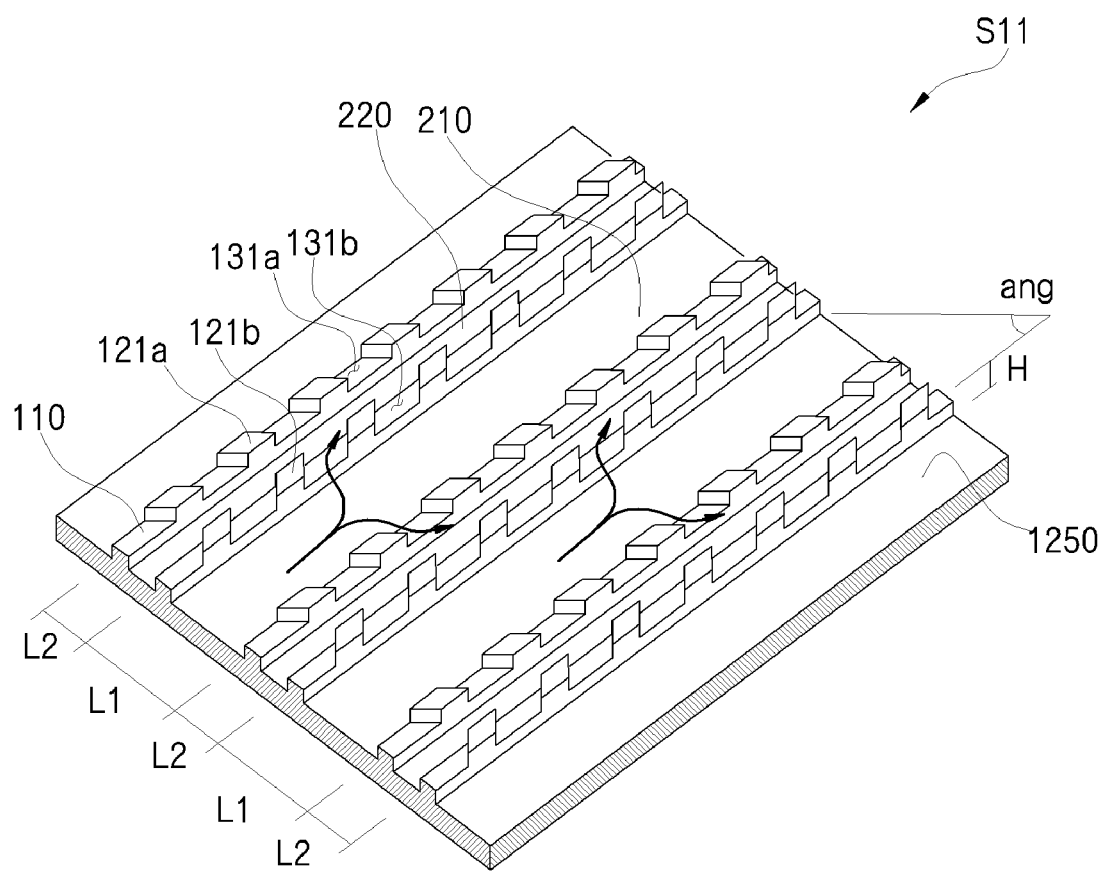

[FIG. 7]
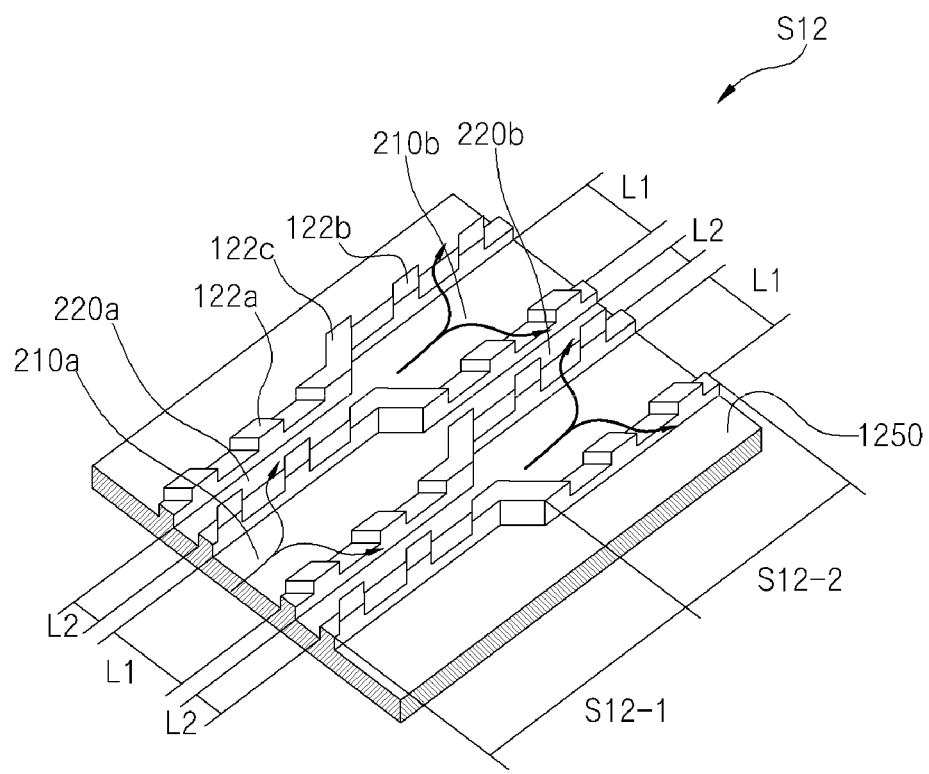

[FIG. 8A]
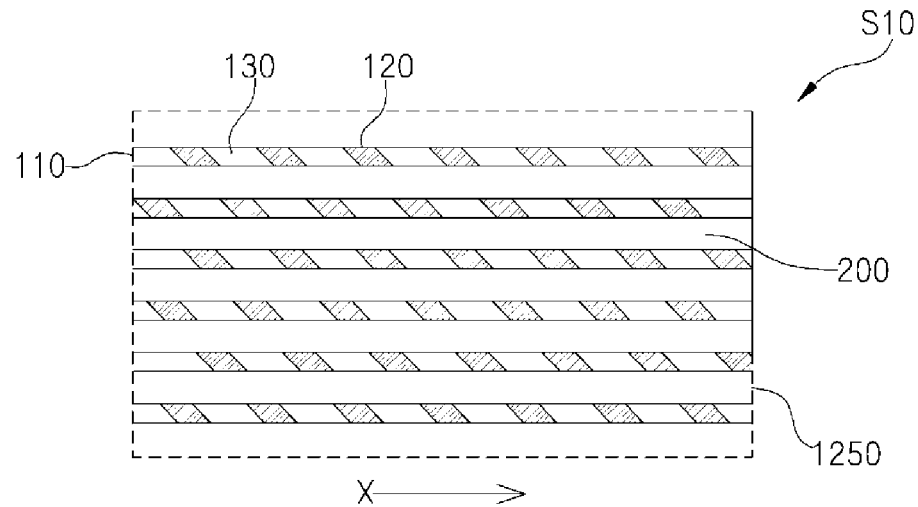
[FIG. 8B]
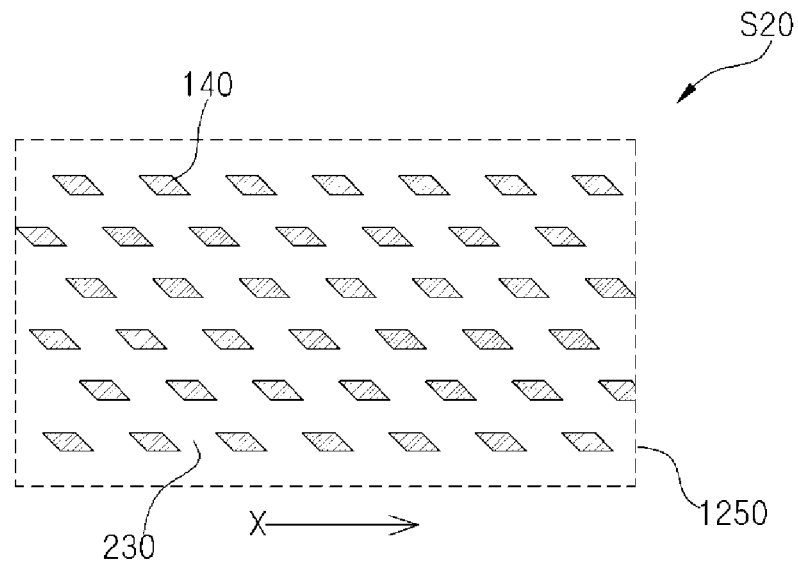

[FIG. 9]
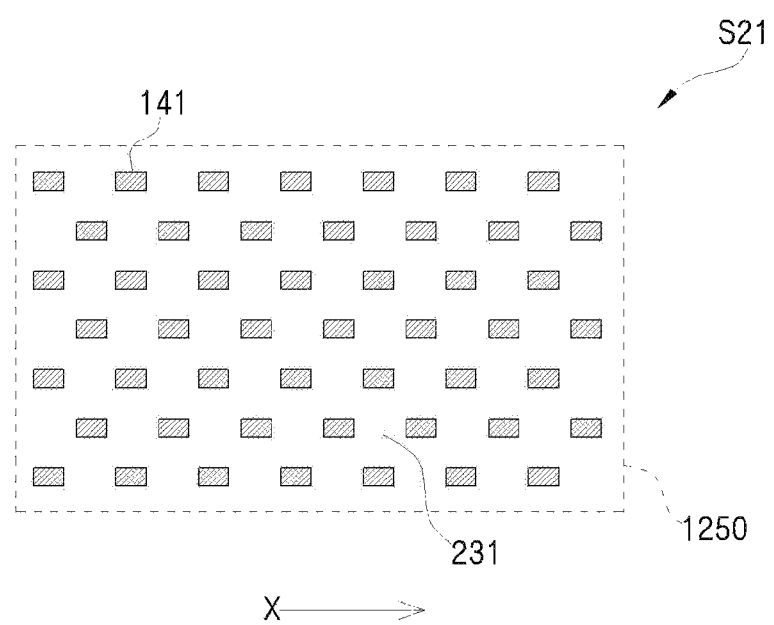

[FIG. 10]
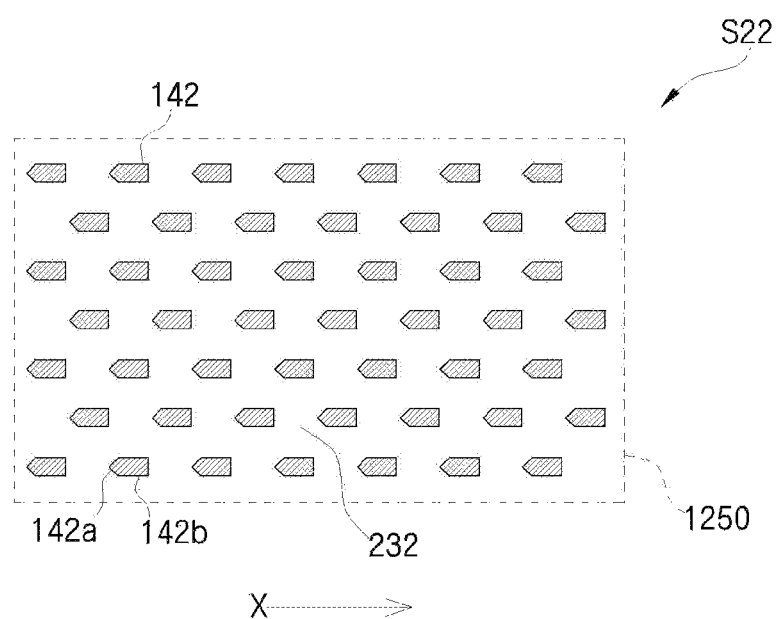

[FIG. 11]
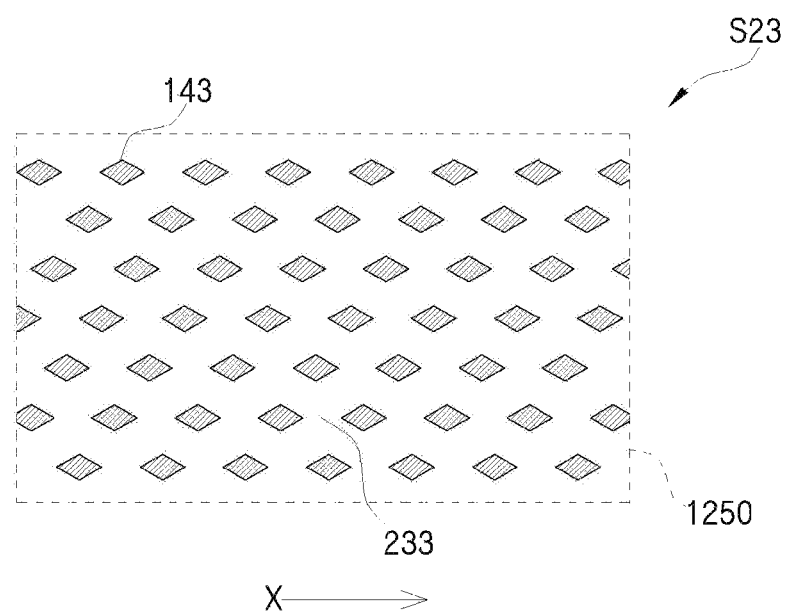

[FIG. 12]
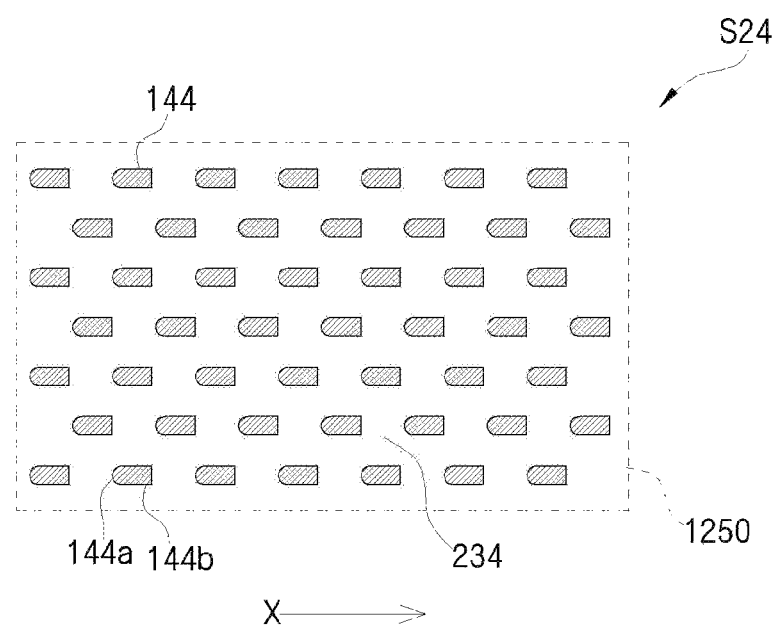

[FIG. 13]
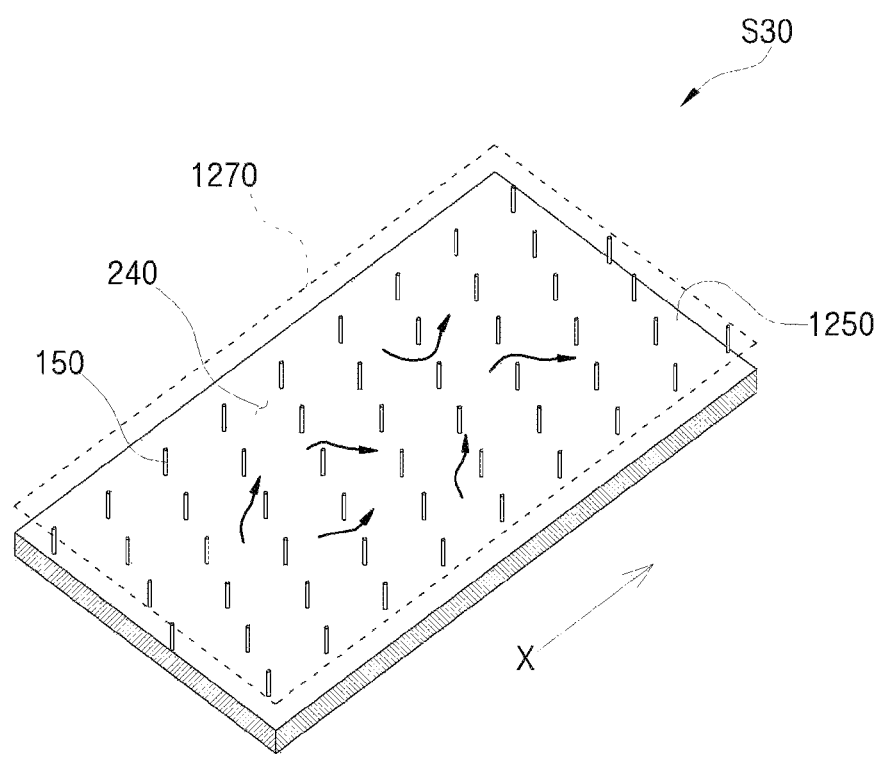

[FIG. 14]
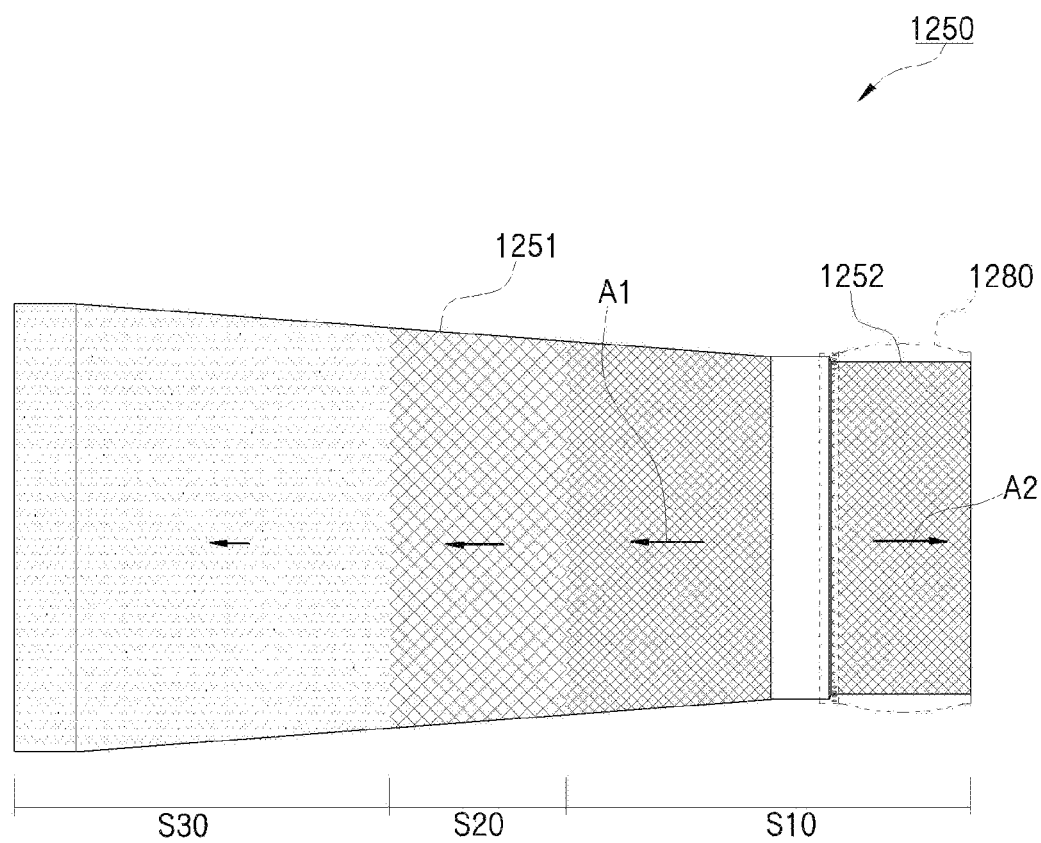

[FIG. 15A]
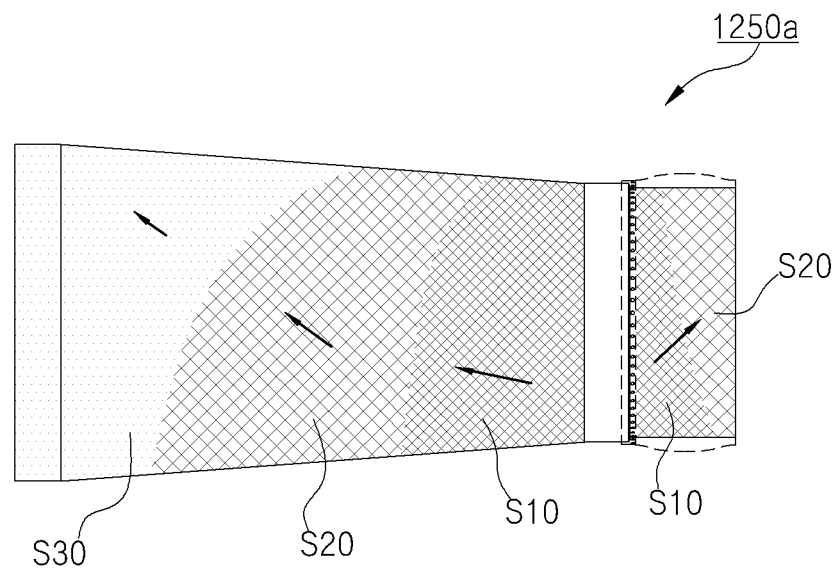
[FIG. 15B]
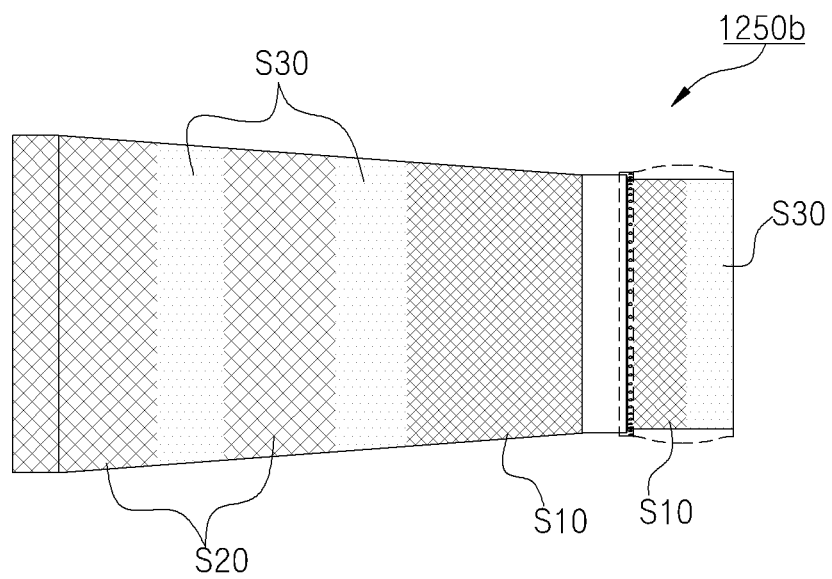

[FIG. 16]
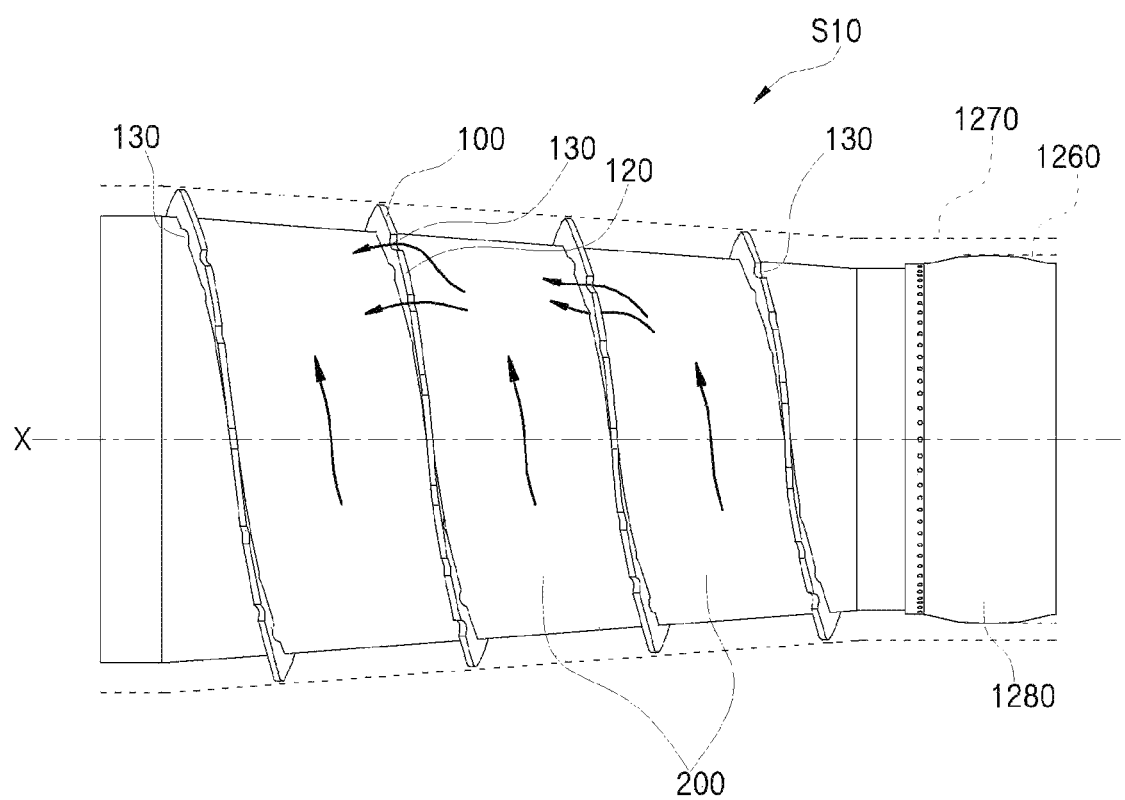

TURBULENCE GENERATING STRUCTURE FOR LINER COOLING ENHANCEMENT AND GAS TURBINE COMBUSTOR HAVING THE SAME

CROSS-REFERENCE TO RELATED APPLICATIONS

This application claims priority to Korean Patent Application No. 10-2017-0130105, filed on Oct. 11, 2017, the disclosure of which is incorporated herein by reference in its entirety.

BACKGROUND OF THE INVENTION

Field of the Invention

Exemplary embodiments of the present disclosure relate to a gas turbine, and more particularly, to a duct assembly structure for enhancing film cooling of a liner applied to a gas turbine combustor.

Description of the Related Art

A gas turbine combustor is disposed between a compressor and a turbine, and serves to produce high-energy combustion gas by mixing fuel with compressed air supplied from the compressor for isobaric combustion and to send the produced combustion gas to the turbine to convert the thermal energy of the combustion gas into mechanical energy.

This combustor includes a duct assembly that is composed of a liner which is in direct contact with hot combustion gas, a flow sleeve surrounding the liner, etc., in which case it is necessary to suitably cool a transition piece or the like. To this end, a portion of the compressed air flowing out of the compressor permeates into an internal annular space through the introduction hole of the flow sleeve to cool the liner (see FIG. 2).

In particular, hot combustion gas flows downstream as ignition and combustion are performed in the liner, and thus the surface of the liner is continuously exposed to a high-temperature environment. On the other hand, compressed air for cooling flows through the annular space surrounded by the liner and the flow sleeve for film cooling (see FIG. 3). In particular, since the surface of a rear liner coupled with an elastic support (e.g., a seal) has poor cooling performance, a separate passage is formed between the seal and a combustion chamber through an introduction hole formed in the surface (see FIG. 4).

However, according to the surface structure of the conventional liner for cooling, the flow of compressed air guided from the introduction hole of the flow sleeve is simple, especially in the passage formed in the rear liner as well. Hence, there is a problem in that maximum cooling efficiency may not be exhibited by limited compressed air.

SUMMARY OF THE INVENTION

The present disclosure has been made in view of the above-mentioned problem, and an object thereof is to provide a turbulence generating structure capable of avoiding a pressure drop and generating optimum turbulence for enabling compressed air limitedly supplied from a compressor to stay for a maximum time on a liner surface while maximizing a cooling area thereon, thereby generally enhancing liner cooling efficiency, and a gas turbine combustor having the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In order to accomplish the above object, there are provided a turbulence generating structure for liner cooling enhancement and a gas turbine combustor having the same. In accordance with an aspect of the present disclosure, there is provided a turbulence generating structure for liner cooling enhancement, which is a liner cooling structure applied to a double-structured annular space defined by a liner and a flow sleeve to cool a duct assembly. The turbulence generating structure may include the liner; and a first turbulence generator protruding from a surface space of the liner and comprising a plurality of ribs arranged in an axial direction of the liner, each of the ribs comprising blocks arranged at regular distances in the axial direction and interspaced by cooling holes, the plurality of ribs including a first set of adjacent ribs separated by a first passage distance, the first passage distance being repeated in a circumferential direction of the liner, and a second set of adjacent ribs separated by a second passage distance, the second passage distance being repeated in the circumferential direction, wherein the first and second sets of adjacent ribs have exactly one rib in common, and the first passage distance is greater than the second passage distance.

The first turbulence generator may be configured such that each of the blocks formed on each of the ribs has angled front and rear surfaces and a passage is diagonally formed by the cooling hole.

The angled surfaces of the blocks may be symmetrical with respect to the first passage distance or the second passage distance.

Each of the angled surfaces of the blocks may form an acute angle with the axial direction.

The first turbulence generator may be configured such that the first and second passage distances vary in the axial direction.

The first and second passage distances may occupy of a first region of the liner, and each of the ribs may have a bent portion enabling the first passage distance to change to a second passage distance of a second region of the liner and enabling the second passage distance to change to a first passage distance of the second region of the liner.

The turbulence generating structure may further include a second turbulence generator that protrudes from a surface space of the liner separate from the surface space occupied by the first turbulence generator and includes blocks arranged at regular distances in the circumferential direction of the liner, the blocks being arranged to intersect in the axial direction to define a cooling space therebetween.

The second turbulence generator may be configured such that each of the blocks has angled front and rear surfaces and a passage is diagonally formed by the cooling space.

The blocks may be circumferentially formed at a predetermined distance such that the passage distances between the ribs provided in the first turbulence generator lead to the second turbulence generator.

The second turbulence generator may be configured such that each of the blocks has a chamfered edge, and such that the chamfered edge is formed only at a front surface of the block. The chamfered edge may have a curved shape.

The first turbulence generator and the second turbulence generator may be sequentially arranged according to a flow of the compressed air for cooling.

The first turbulence generator and the second turbulence generator may be bounded by parameters such as a flow velocity and a flow rate of the compressed air for cooling.

The turbulence generating structure may further include a third turbulence generator that protrudes from a surface space of the liner separate from the surface spaces occupied by the first and second turbulence generators and includes pins arranged in the axial and circumferential directions of the liner, and a cooling space defined between the pins.

The first turbulence generator, the second turbulence generator, and the third turbulence generator may be selectively and sequentially arranged according to a flow of the compressed air for cooling.

In accordance with another aspect of the present disclosure, there is provided a duct assembly provided in a combustor. The duct assembly may include a transition piece; a liner connected to the transition piece through an elastic support; a flow sleeve surrounding the transition piece and the liner; and the above first turbulence generator.

In accordance with another aspect of the present disclosure, there is provided a gas turbine combustor including the above duct assembly.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cutaway perspective view of a gas turbine to which may be applied a turbulence generating structure for liner cooling enhancement according to an embodiment of the present disclosure;

FIG. 2 is a sectional view of a gas turbine combustor into which compressed air for cooling may be introduced;

FIG. 3 is a sectional view of a liner and a flow sleeve according to a related art, illustrating a flow of compressed air for cooling a surface of the liner;

FIG. 4 is a sectional view of a rear liner of FIG. 3;

FIGS. 5-7 are perspective views of respective examples of a first turbulence generator in a turbulence generating structure for liner cooling enhancement according to an embodiment of the present disclosure;

FIGS. 8A and 8B are arrangement views for explaining an example of first and second turbulence generators in the turbulence generating structure for liner cooling enhancement according to the embodiment of the present disclosure;

FIG. 9 is a view generally illustrating another example of a second turbulence generator in the turbulence generating structure for liner cooling enhancement according to the embodiment of the present disclosure;

FIGS. 10 to 12 are views generally illustrating a further example of a second turbulence generator in the turbulence generating structure for liner cooling enhancement according to the embodiment of the present disclosure;

FIG. 13 is view generally illustrating an example of a third turbulence generator in the turbulence generating structure for liner cooling enhancement according to the embodiment of the present disclosure;

FIG. 14 is a conceptual view illustrating arrangement of turbulence generators in the turbulence generating structure for liner cooling enhancement according to the embodiment of the present disclosure;

FIGS. 15A and 15B are conceptual views illustrating an example of arrangement of turbulence generators in the turbulence generating structure for liner cooling enhancement according to the embodiment of the present disclosure; and FIG. 16 is a view illustrating an example of a surface of a front liner to which the turbulence generating structure for liner cooling enhancement according to the embodiment of the present disclosure is applied.

DESCRIPTION OF SPECIFIC EMBODIMENTS

Exemplary embodiments of the present disclosure will be described below in more detail with reference to the accompanying drawings.

In certain embodiments, detailed descriptions of configurations well known by those skilled in the art will be omitted to avoid obscuring appreciation of the disclosure. Wherever possible, the same reference numbers will be used throughout the drawings to refer to the same or like parts. It should be considered that the thickness of each line or the size of each component in the drawings may be exaggeratedly illustrated for clarity and convenience of description.

It will be understood that, although terms "first", "second", "A", "B", "(a)", "(b)", etc. may be used herein to describe various elements, these terms are only used to distinguish one element from another element. The substance, sequence or order of these elements is not limed by the terms. It will be understood that when an element is referred to as being "connected", "coupled", or "led" to another element, not only can it be directly "connected", "coupled", or "led" to the other element, but also can it be indirectly "connected", "coupled", or "led" to the other element with other elements being interposed therebetween.

The ideal thermodynamic cycle of a gas turbine is a Brayton cycle. The Brayton cycle includes four processes of isentropic compression (adiabatic compression), isobaric heat addition, isentropic expansion (adiabatic expansion), and isobaric heat dissipation. In other words, in the Brayton cycle, atmospheric air is sucked and compressed to a high pressure, thermal energy is radiated in an isobaric environment for combustion of fuel to be converted into kinetic energy by expansion of hot combustion gas, and then exhaust gas with remaining energy is discharged to the atmosphere. That is, the Brayton cycle is a cycle composed of four processes of compression, heating, expansion, and exhaust. The gas turbine using the Brayton cycle includes a compressor, a combustor, and a turbine.

FIG. 1 illustrates an overall configuration of a gas turbine 1000. Although the following description is given with reference to FIG. 1, the present disclosure may be widely applied to a gas turbine having the same or similar configuration as the gas turbine 1000.

The gas turbine 1000 includes a compressor 1100 which serves to suck and compress air. The compressor 1100 supplies combustion air to a combustor 1200 while supplying cooling air to a high-temperature region of the gas turbine 1000 which requires cooling. Drawn air is compressed in the compressor 1100 through an adiabatic compression process, which increases the pressure and the temperature of air passing through the compressor 1100. The compressor 1100 of the large gas turbine 1000 is a multi-stage axial-flow compressor configured such that a large amount of air is compressed to a desired compression ratio while passing through each stage.

FIG. 2 illustrates an example of the combustor 1200 included in the gas turbine 1000. The combustor 1200 mixes fuel with the compressed air supplied from the outlet of the compressor 1100, to produce high-energy combustion gas by isobaric combustion. The combustor 1200 is disposed downstream of the compressor 1100 and includes a plurality of burners 1220 arranged along an annular combustor casing 1210. Each of the burners 1220 includes a plurality of combustion nozzles 1230, and the fuel injected from the combustion nozzles 1230 is mixed with air at an appropriate ratio to be suitable for combustion.

The gas turbine 1000 may use gas fuel, liquid fuel, or a combination thereof (e.g., composite fuel). It is important to make a combustion environment for reducing an amount of emission such as carbon monoxide or nitrogen oxide that is subject to legal regulations. Thus, pre-mixed combustion has been increasingly used in recent years in that it can lower combustion temperature and accomplish uniform combustion to reduce emission even though it is relatively difficult to control combustion.

In the pre-mixed combustion, compressed air is mixed with the fuel injected from the combustion nozzles 1230 and then introduced into a combustion chamber 1240. Once combustion is stable after pre-mixed gas is initially ignited by an igniter, the combustion is maintained by supply of fuel and air.

The combustor 1200 needs to be suitably cooled since it operates at the highest temperature in the gas turbine 1000. Especially, a turbine inlet temperature (TIT) is very important in the gas turbine 1000 because the efficiency of the gas turbine 1000 is typically increased as the turbine inlet temperature becomes high. In addition, the increase of the turbine inlet temperature is advantageous for gas turbine combined power generation. For this reason, the class (grade) of the gas turbine 1000 is also classified based on the turbine inlet temperature.

Ultimately, the temperature of combustion gas must be increased to increase the turbine inlet temperature. Accordingly, it is important that a duct assembly, which forms the combustion chamber 1240 and passage of the combustor 1200 for the flow of hot combustion gas, be designed to be made of a high heat-resistant material and desirably cooled.

Referring to FIG. 2, the duct assembly includes a liner 1250, a transition piece 1260, and a flow sleeve 1270 and connects the burners 1220 to the turbine 1300 so that hot combustion gas flows therebetween. Compressed air flows along the outer surface of the duct assembly and is supplied to the combustion nozzles 1230. In this process, the duct assembly heated by the hot combustion gas is suitably cooled.

The duct assembly has a double structure in which the flow sleeve 1270 surrounds the liner 1250 and the transition piece 1260 that are connected through an elastic support 1280. Compressed air permeates into an annular space inside the flow sleeve 1270 to cool the liner 1250 and the transition piece 1260.

The liner 1250 is a tubular member connected to the burners 1220 of the combustor 1200 and forms the combustion chamber 1240 as an internal space therein. The transition piece 1250 connected to the liner 1250 is connected to the inlet of the turbine 1300 and serves to guide hot combustion gas to the turbine 1300. The flow sleeve 1270 serves to protect the liner 1250 and the transition piece 1260 and to prevent direct emission of high-temperature heat to the outside.

In particular, it is necessary to suitably cool the liner 1250 and the transition piece 1260 because they are in direct contact with hot combustion gas. The liner 1250 and the transition piece 1260 are basically protected from hot combustion gas through film cooling by compressed air. For example, the duct assembly has a complex double wall structure to directly introduce compressed air to the inner peripheral surfaces of the liner 1250 and the transition piece 1260 for effective film cooling, as illustrated in FIG. 2.

Since ends of the liner 1250 and the transition piece 1260 are respectively fixed to the combustor 1200 and the turbine 1300, the elastic support 1280 must have a structure that is capable of allowing length and diameter extension by thermal expansion to support the liner 1250 and the transition piece 1260.

The high-temperature and high-pressure combustion gas produced in the combustor 1200 is supplied to the turbine 1300 through the duct assembly. In the turbine 1300, combustion gas gives impingement or reaction force to a plurality of blades radially arranged on the rotary shaft of the turbine 1300 while adiabatically expanding, thereby converting the thermal energy of the combustion gas into mechanical energy for rotation of the rotary shaft. Some of the mechanical energy obtained in the turbine 1300 is supplied as energy required for compression of air in the compressor, and the remainder is used as effective energy required for driving a generator to produce electric power or the like.

The gas turbine 1000 is advantageous in that it can consume a very small amount of lubricant, have a significantly reduced amplitude which is a characteristic of reciprocating machines, and operate at a high speed because its main components do not reciprocate to have no friction portion, for example, between a piston and a cylinder.

The thermal efficiency in the Brayton cycle is increased as a compression ratio related to compression of air becomes high and the temperature of combustion gas (turbine inlet temperature) introduced in the above-mentioned isentropic expansion process becomes high. Therefore, the gas turbine 1000 is also progressing in a direction of increasing the compression ratio and the temperature at the inlet of the turbine 1300.

Hereinafter, a turbulence generating structure for liner cooling enhancement according to an embodiment of the present disclosure applied to the combustor 1200 and duct assembly of the gas turbine 1000 will be described in detail with reference to FIGS. 2 to 16.

FIG. 2 shows a typical gas turbine combustor into which compressed air is introduced for cooling. FIGS. 3 and 4 each show a flow of compressed air for cooling according to a related art. FIG. 3 illustrates the flow of compressed air for cooling a liner, and FIG. 4 particularly illustrates the flow of compressed air for cooling a surface of a rear liner 1252 coupled with a seal.

Referring to FIGS. 2-4, the combustor includes a duct assembly that is composed of a liner 1250 and a transition piece 1260, which are in direct contact with hot combustion gas, a flow sleeve 1270 surrounding them, etc., in which case it is necessary to suitably cool the transition piece 1260 or the like. To this end, a portion of compressed air A flowing out of a compressor permeates into an internal annular space through the introduction hole of the flow sleeve to cool the liner 1250.

In particular, hot combustion gas H flows downstream as ignition and combustion are performed in the liner 1250, and thus the surface of the liner 1250 is continuously exposed to a high-temperature environment. On the other hand, the compressed air for cooling A flows through a side portion surrounded by the liner and the flow sleeve for film cooling. In particular, referring to FIG. 4, since the surface of a rear liner 1252 coupled with a seal as the elastic support 1280 has poor cooling performance, an airpath A2 that is separate from an airpath A1 is formed between the seal and a combustion chamber through an introduction hole 1253 formed in the surface.

The present disclosure is to improve a conventional surface structure for liner cooling, and more particularly, to provide a turbulence generating structure that can exhibit maximum cooling efficiency even with limited compressed air by improving a simple passage for compressed air guided from an introduction hole of a flow sleeve and a passage formed within a rear liner.

FIGS. 5, 6, and 7 respectively illustrate examples of a first turbulence generator S10, S11, and S12 in a turbulence generating structure for liner cooling enhancement according to an embodiment of the present disclosure.

The present disclosure relates to a turbulence generating structure for liner cooling enhancement which may be applied to a duct assembly and to a gas turbine combustor 1200 including the duct assembly. In detail, the combustor 1200 includes a duct assembly that is composed of a transition piece 1260, a liner 1250 connected to the transition piece 1260 through the elastic support 1280, and a flow sleeve 1270 surrounding the transition piece 1260 and the liner 1250, and the present disclosure relates to a liner cooling structure applied to a double-structured annular space defined by a front liner 1251 or a rear liner 1252, coupled with a seal, and a flow sleeve 1270.

Referring to FIGS. 5-7, the turbulence generating structure of the present disclosure includes the first turbulence generator S10, S11, or S12 (collectively, S10), and may further include a second turbulence generator S20, S21, S22, S23, or S24 (collectively, S20) and a third turbulence generator S30, which will be described later. The overall turbulence generating structure of the liner 1250 is formed by combining the turbulence generators S10, S20, and S30.

First, the first turbulence generator S10 will be described with reference to FIG. 5. The first turbulence generator S10 includes a plurality of ribs 100 arranged in an axial direction X on the surface of the liner 1250 while protruding therefrom, and each of the ribs 100 includes a linear protrusion 110. blocks 120 arranged at regular distances in the axial direction X while protruding from the linear protrusion 110, and cooling grooves 130 formed between the blocks 120.

Here, a first passage 210 having a first passage distance L1 between any adjacent ribs 100a and 100b is greater than a second passage 220 having a second passage distance L2 adjacent to the first passage distance L1. That is, first and second ribs 100a and 100b are disposed adjacent, and the first passage distance L1 therebetween is greater than the second passage distance L2 between the second rib 100b and a third rib 100c adjacent thereto.

In addition, the first passage distance L1 and the second passage distance L2 may be repeatedly formed in a circumferential direction so that compressed air for cooling permeates a low-pressure passage.

In detail, since the flow rate of compressed air for cooling, which flows in the first passage distance L1 as a relatively great distance, is reduced whereas the pressure thereof is increased, lateral turbulence is generated by an artificial difference in pressure between the first passage distance L1 and the second passage distance L2 adjacent thereto. That is, the compressed air in the first passage distance L1 causes a cooling action in the axial direction and is simultaneously transferred to both adjacent second pas-sage distances L2 through the cooling grooves 130, to thereby maximize turbulence.

The first turbulence generator S10 may be embodied in the following different examples.

Referring to FIG. 6, the rib 100 may include blocks 121 formed to each have angled front and rear surfaces and passages diagonally formed by cooling grooves 131.

The angled surfaces of the blocks 121 are formed in a certain pattern or at a certain angle to coincide therewith. Thus, it is possible to form an auxiliary diagonal flow of compressed air for cooling, independently of the axial flow of compressed air.

Here, it is preferable that the angled surface of each block form an acute angle with the axial direction to sufficiently generate turbulence without interference with the axial flow of compressed air. In more detail, the acute angle may be an angle of 30 to 45 degrees.

In another example, the angled surfaces of the blocks may be symmetrical with respect to the first passage distance L1 or the second passage distance L2 (see FIG. 6). This symmetry may be embodied by forming the path of lateral turbulence in both second passage distances L2 adjacent to the first passage distance L1. In other words, first and second ribs forming the second passage distance L2 include blocks 121a and 121b that are respectively arranged at regular distances in the axial direction X with respect to the second passage distance L2, wherein each of the blocks 121a and 121b may have angled front and rear surfaces and passages may be formed in the axial direction X by cooling grooves 131a and 131b between the blocks 121a and 121b so as to be symmetrical thereto in the diagonal direction.

Thus, the compressed air for cooling flowing in the first passage distance L1 may more easily permeate low-pressure passages in the second passage distance L2, thereby contributing to an increase in turbulence.

Referring to FIG. 7, the first turbulence generator S10 may be formed such that first and second passage distances L1 and L2 vary in the axial direction X. In detail, each rib may have a bent portion 122c such that a first passage 210a having first passage distance L1 and a second passage 220a having second passage distance L2 (see region S12-1 in FIG. 7) are respectively changed to a second passage 220b having second passage distance L2 and a first passage 210b having first passage distance L1 (see region S12-2 in FIG. 7).

Through such a variable structure, the direction of the angles of the front and rear surfaces of blocks 122a and 122b may be switched such that the path of lateral turbulence is formed in both second passage distances L2 adjacent to the first passage distance L1.

Thus, in the first turbulence generator S12, a cooling action is caused in the axial direction while lateral turbulence is guided to the adjacent second passage distance L2, and the first and second passage distances L1 and L2 are alternately changed in the axial direction. Therefore, limited compressed air can stay for a maximum time on the surface of the liner while maximizing a cooling area thereon.

FIGS. 8A and 8B respectively illustrate examples of the first and second turbulence generators S10 and S20 in the turbulence generating structure for liner cooling enhancement according to the embodiment of the present disclosure. FIG. 9 illustrates another example of the second turbulence generator S20 in the turbulence generating structure for liner cooling enhancement according to the embodiment of the present disclosure.

Referring to FIGS. 8A, 8B, and 9, the second turbulence generator S20 may include blocks 140 arranged at regular distances in a circumferential direction (which refers to a vertical direction in FIGS. 8A and 8B) on the surface of the liner 1250 while protruding therefrom. The blocks 140 may be arranged to intersect in the axial direction X to define cooling spaces 230 therebetween.

In the example of FIG. 8B, each of the blocks 140 may have angled front and rear surfaces and passages are circumferentially formed by the cooling spaces 230 such that an auxiliary diagonal flow of compressed air for cooling is formed together with the axial flow of compressed air. In the present example, the blocks 140 may be radially formed at a predetermined distance such that the passage distances between the ribs included in the first turbulence generator S10 lead to the second turbulence generator S20.

According the structure of the second turbulence generator S20 (see FIG. 9), by generating or increasing intersection turbulence in the compressed air for cooling flowing in the axial direction X for formation of the cooling structure suitable for the reduced flow velocity or flow rate, it is possible to increase the general residence time and cooling area of compressed air for cooling.

FIGS. 10 to 12 generally illustrate a further example of a second turbulence generator S20 in the turbulence generating structure for liner cooling enhancement according to the embodiment of the present disclosure.

Referring to FIG. 10, the second turbulence generator S22 may include blocks 142, each of which has a chamfered edge 142a. Thus, by the arrangement of the blocks 142, it is possible to increase the residence time of intersection turbulence and minimize a side effect due to pressure drop.

The chamfer edge 142a may be formed only at the front surface of the block 142 in consideration of processing costs, or may be formed at both front and rear surfaces of the block 142 such that the block 142 is a diamond block 143 to contribute to activation of intersection turbulence in cooling spaces 233, as illustrated in FIG. 11.

Referring to FIG. 12, the chamfered edge may be curved. In detail, each of blocks 144 includes a front surface having a semicircular chamfer 144a and may be arranged while protruding in cooling spaces 234.

By forming the cooling structure suitable for the reduced flow velocity or flow rate according to the flow of compressed air for cooling, the second turbulence generator S20 may be applied to the front or rear liner 1251 or 1252, independently of the first turbulence generator S10.

In consideration of the flow velocity and flow rate of the compressed air for cooling passing through the entire liner 1250, it is preferable that the first turbulence generator S10 and the second turbulence generator S20 be sequentially arranged on the surface of the liner according to the flow of compressed air for cooling (see FIG. 14 to be described later).

Here, the axial direction X refers to a direction in which compressed air for cooling introduced from the flow sleeve 1270 flows along the central axis of the liner 1250. Accordingly, when viewed from the surface of the front liner 1251, the first turbulence generator S10 and the second turbulence generator S20 may be arranged sequentially from the rear.

In addition, the first turbulence generator S10 and the second turbulence generator S20 may also be sequentially arranged on the surface of the rear liner 1252. The first turbulence generator S10 and the second turbulence generator S20 may be arranged sequentially from the front according to the flow of compressed air for cooling (see A2 of FIG. 4).

Since the first turbulence generator S10 and the second turbulence generator S20 are bounded by parameters such as the flow velocity and flow rate of compressed air for cooling, it is possible to generate optimized turbulence for the cooling of the liner to maximize overall cooling efficiency with limited compressed air.

In particular, it is possible to provide a turbulence generating structure for optimized cooling on the surface of the rear liner 1252 that is coupled with the seal and has poor cooling performance.

FIG. 13 illustrates an example of the third turbulence generator S30 in the turbulence generating structure for liner cooling enhancement according to the embodiment of the present disclosure.

Referring to FIG. 13, the third turbulence generator S30 may include pins 150 arranged in axial and circumferential directions on the surface of the liner 1250 while protruding therefrom, and cooling spaces 240 defined between the pins.

Thus, by generating or increasing intersection turbulence corresponding to the inevitably reduced flow velocity or flow rate according to the axial flow of compressed air for cooling, it is possible to increase the general residence time or the like of compressed air for cooling.

By forming the cooling structure suitable for the reduced flow velocity or flow rate according to the flow of compressed air for cooling, the third turbulence generator S30 may be applied to the front or rear liner 1251 or 1252, independently of the first or second turbulence generator S10 or S20.

In detail, the structure of the third turbulence generator S30 may be applied to the surface of the liner 1250 so as to correspond to the compressed air for cooling having a further reduced flow velocity compared to the second turbulence generator S20.

The arrangement of the first to third turbulence generators S10, S20, and S30 on the surface of the liner 1250 will be described below.

FIGS. 14, 15A, and 15B illustrate the arrangement of the turbulence generators in the turbulence generating structure for liner cooling enhancement according to the embodiment of the present disclosure.

As described above, the first turbulence generator S10, the second turbulence generator S20, and the third turbulence generator S30 may be selectively and sequentially arranged on the surface of the liner 1250 according to the flow of compressed air for cooling.

Here, the selective arrangement means that only the first and third turbulence generators S10 and S30 may be sequentially arranged considering a reduction in flow velocity and flow rate, the axial length of the entire liner 1250, etc., while maintaining the arrangement order of the first turbulence generator S10, the second turbulence generator S20, and the third turbulence generator S30 on the surface of the liner 1250 according to the flow of compressed air for cooling.

Similarly, the first turbulence generator S10, the second turbulence generator S20, and the third turbulence generator S30 may be selectively and sequentially arranged on the surface of the rear liner 1252.

In addition, the first to third turbulence generators S10, S20, and S30 may be bounded by parameters such as the flow velocity and flow rate of compressed air for cooling. Thus, this boundary may be provided in a rectilinear, curved, or diagonal form according to the change of the flow velocity and flow rate of compressed air for cooling, which are determined according to various elements such as the size, type, and material of the liner 1250 (see FIGS. 14, 15A, and 15B).

In addition, the length of each of the turbulence generators in the axial direction X may be determined by parameters such as the flow velocity and flow rate of compressed air for cooling the liner 1250.

Furthermore, the third turbulence generator S30 may be artificially inserted in the middle of the second turbulence generator S20 in consideration of the change of the flow velocity and flow rate of compressed air for cooling, as illustrated in FIG. 15B.

Accordingly, by combining the turbulence generators S10, S20, and S30, it is possible to generate optimized turbulence for the overall cooling of the liner to maximize cooling efficiency with limited compressed air.

FIG. 16 illustrates an example of the surface of the front liner to which the turbulence generating structure for liner cooling enhancement according to the embodiment of the present disclosure is applied.

This example illustrates a turbulence generating structure in which the first turbulence generator S10 is applied to the front liner 1251.

In detail, a plurality of ribs 100 may be arranged and protrude in a spiral form to form a certain angle with the axial direction X, and each of the ribs 100 may include blocks 120 protruding at regular distances in the direction thereof and cooling holes 130 formed between the blocks 120.

Since the plurality of ribs 100 are arranged in a diagonal direction (in a spiral direction on the surface of the liner) instead of the axial direction X and the cooling holes 130 are formed to guide compressed air for cooling in the axial direction X, it is possible to change passages on the surface of the liner 1250 in various manners.

As such, since the turbulence generating structure for liner cooling enhancement according to the embodiment of the present disclosure is applied to the duct assembly and the gas turbine combustor including the same, it is possible to generate optimum turbulence for enabling the compressed air limitedly supplied from the compressor of the gas turbine to reside for a maximum time on the surface of the liner while maximizing a cooling area, and to minimize a pressure drop. Therefore, it is possible to generally enhance liner cooling efficiency.

In particular, it is possible to intensively cool the inside of the liner coupled with the seal by providing the turbulence generating structure that allows the limited compressed air for cooling to be introduced to the surface of the rear liner, the cooling performance of which is poor, at an optimized flow velocity and flow rate.

As is apparent from the above description, since the turbulence generating structure for liner cooling enhancement according to the present disclosure is applied to the duct assembly and the gas turbine combustor including the same, it is possible to generate optimum turbulence for enabling the compressed air limitedly supplied from the compressor of the gas turbine to reside for a maximum time on the surface of the liner while maximizing a cooling area, and to minimize a pressure drop. Therefore, it is advantageous to generally enhance liner cooling efficiency.

In particular, it is advantageous to intensively cool the inside of the liner coupled with the seal by providing the turbulence generating structure that allows the limited compressed air for cooling to be introduced to the surface of the rear liner, the cooling performance of which is poor, at an optimized flow velocity and flow rate.

The turbulence generating structure for liner cooling enhancement and the gas turbine combustor having the same according to the present disclosure have been described above to improve the cooling performance of the transition piece. It will be understood by those skilled in the art that various modifications may be made without departing from the spirit and scope or essential features of the disclosure.

Therefore, it should be understood that the embodiments described above are for purposes of illustration only in all aspects and are not intended to limit the scope of the present disclosure.

What is claimed is:

1. A structure for generating turbulence in a double-wall annular space defined by a liner and a flow sleeve to cool a duct assembly, the turbulence generating structure comprising:

the liner; and a first turbulence generator protruding from a first surface space of the liner and comprising a plurality of ribs arranged in an axial direction of the liner, each of the plurality of ribs comprising a plurality of rib blocks interspaced by a plurality of cooling grooves and arranged at regular intervals in the axial direction, the first turbulence generator further comprising:

a plurality of first passages spaced circumferentially about the liner, each of the plurality of first passages defined by a respective first set of adjacent ribs separated by a first passage distance, and a plurality of second passages spaced circumferentially about the liner, each of the plurality of second passages defined by a respective second set of adjacent ribs separated by a second passage distance different from the first passage distance.

2. The turbulence generating structure according to claim 1, wherein the first turbulence generator is configured such that each rib block of the plurality of rib blocks has angled front and rear surfaces and such that a rib passage is diagonally formed by one of the plurality of cooling rooves.

3. The turbulence generating structure according to claim 2, wherein the angled surfaces of the rib blocks defining the first passage distance are mirror images of each other across a corresponding first passage of the plurality of first passages, and wherein the angled surfaces of the rib blocks defining the second passage distance are mirror images of each other across a corresponding second passage of the plurality of second passages.

4. The turbulence generating structure according to claim 2, wherein each of the angled surfaces of the rib blocks forms an acute angle with the axial direction.

5. The turbulence generating structure according to claim 1, wherein the first turbulence generator is configured such that the first and second passage distances vary in the axial direction.

6. The turbulence generating structure according to claim 5, wherein at least one rib block of the plurality of rib blocks includes a bent portion enabling an upstream portion of the first passage to have an upstream first passage distance and a downstream portion of the first passage to have a downstream first passage distance different than the upstream first passage distance.

7. The turbulence generating structure according to claim 1, further comprising a second turbulence generator that protrudes from a second surface space of the liner separate from the first surface space occupied by the first turbulence generator and comprises a plurality of liner blocks arranged at regular distances in the circumferential direction of the liner, the liner blocks being arranged in the axial direction to define a first cooling space between adjacent liner blocks.

8. The turbulence generating structure according to claim 7, wherein the second turbulence generator is configured such that each of the liner blocks has angled front and rear surfaces and such that a cooling passage is diagonally formed by the first cooling space.

9. The turbulence generating structure according to claim 7, wherein the liner blocks are circumferentially formed at a predetermined distance.

10. The turbulence generating structure according to claim 7, wherein the first turbulence generator and the second turbulence generator are sequentially arranged according to a flow of compressed air for cooling.

11. The turbulence generating structure according to claim 7, further comprising a third turbulence generator that protrudes from a third surface space of the liner separate from the first and second surface spaces occupied by the first and second turbulence generators and comprises pins arranged in the axial and circumferential directions of the liner, and a second cooling space defined between the pins.

12. The turbulence generating structure according to claim 11, wherein the first turbulence generator, the second turbulence generator, and the third turbulence generator are sequentially arranged according to a flow of compressed air for cooling.

13. A duct assembly provided in a combustor, comprising:
a transition piece;
a liner connected to the transition piece through an elastic support;
a flow sleeve surrounding the transition piece and the liner; and
a first turbulence generator protruding from a surface space of the liner and comprising a plurality of ribs arranged in an axial direction of the liner, each of the plurality of ribs comprising a plurality of rib blocks interspaced by a plurality of cooling grooves and arranged at regular intervals in the axial direction, the first turbulence generator further comprising:
a plurality of first passages spaced circumferentially about the liner, each of the plurality of first passages defined by a respective first set of adjacent ribs separated by a first passage distance, and
a plurality of second passages spaced circumferentially about the liner, each of the plurality of second passages defined by a respective second set of adjacent ribs separated by a second passage distance different from the first passage distance.

14. The duct assembly according to claim 13, wherein the turbulence generator is configured such that the first and second passage distances vary in the axial direction.

15. A gas turbine combustor including a duct assembly, the duct assembly comprising:
a transition piece;
a liner connected to the transition piece through an elastic support; a flow sleeve surrounding the transition piece and the liner; and
a first turbulence generator protruding from a surface space of the liner and comprising a plurality of ribs arranged in an axial direction of the liner, each of the plurality of ribs comprising a plurality of rib blocks interspaced by a plurality of cooling grooves and arranged at regular intervals in the axial direction, the first turbulence generator further comprising:
a plurality of first passages spaced circumferentially about the liner, each of the plurality of first passages defined by a respective first set of adjacent ribs separated by a first passage distance, and
a plurality of second passages spaced circumferentially about the liner, each of the plurality of second passages defined by a respective second set of adjacent ribs separated by a second passage distance different from the first passage distance.

16. The gas turbine combustor according to claim 15, wherein the turbulence generator is configured such that the first and second passage distances vary in the axial direction.

\* \* \* \* \*